(12) United States Patent
Adar et al.

(10) Patent No.: US 7,827,325 B2
(45) Date of Patent: Nov. 2, 2010

(54) DEVICE, SYSTEM, AND METHOD OF SPECULATIVE PACKET TRANSMISSION

(75) Inventors: Etai Adar, Yokne'am Ilit (IL); Ilya Granovsky, Haifa (IL); Zorik Machulsky, Gesher HaZiv (IL); Paul J. Mattos, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 11/931,689

(22) Filed: Oct. 31, 2007

(65) Prior Publication Data

US 2009/0113082 A1    Apr. 30, 2009

(51) Int. Cl.
     *G06F 13/38*      (2006.01)
(52) U.S. Cl. .................. 710/29; 710/34; 710/36; 709/232
(58) Field of Classification Search ............ 710/36, 710/52, 15, 305; 370/229, 235, 331, 365, 370/389, 412, 428; 709/223, 232, 234, 235
See application file for complete search history.

(56) References Cited

U.S. PATENT DOCUMENTS

| | | | | |
|---|---|---|---|---|
| 5,699,520 | A * | 12/1997 | Hodgson et al. | 709/234 |
| 6,765,922 | B1 * | 7/2004 | Bunton et al. | 370/428 |
| 7,222,784 | B2 * | 5/2007 | Yamaguchi et al. | 235/380 |
| 7,246,191 | B2 * | 7/2007 | Stanton | 710/310 |
| 7,334,086 | B2 * | 2/2008 | Hass et al. | 711/123 |
| 7,443,869 | B2 * | 10/2008 | Solomon et al. | 370/412 |
| 7,712,006 | B1 * | 5/2010 | Miller | 714/753 |
| 2005/0144339 | A1 * | 6/2005 | Wagh et al. | 710/36 |
| 2006/0274748 | A1 | 12/2006 | Nakashima et al. | |
| 2007/0133415 | A1 * | 6/2007 | Spink | 370/235 |
| 2007/0177498 | A1 * | 8/2007 | Clark et al. | 370/229 |
| 2007/0274215 | A1 * | 11/2007 | Gusat et al. | 370/235 |
| 2008/0144670 | A1 * | 6/2008 | Goossens et al. | 370/503 |

OTHER PUBLICATIONS

PCI Express, PCI Express Base Specification Revision 2.0, Dec. 2006, PCI SIG, pp. 1-642.*

* cited by examiner

*Primary Examiner*—Cheng-Yuan Tseng

(57) ABSTRACT

A mechanism for speculative packet transmission including a credit-based flow control interconnect device to initiate speculative transmission of a Transaction Layer Packet if the number of available flow control (FC) credits is insufficient for completing the transmission. The sending device initiates a speculative transmission of packets to the receiving device even though the packet for transmission requires a number of FC credits greater than the available FC credits. If the additional FC credits required to complete the packet transmission become available to the sending device before the transmission is completed, the packets are then fully transmitted by the sending device. Otherwise, if the additional FC credits required do not become available prior to completion of the transmission, then the sending device aborts the transmission without utilization of the FC credits. The sending device may initiate speculative packet transmission only if a particular minimal amount of FC credits is available.

13 Claims, 3 Drawing Sheets

DEVICE, SYSTEM, AND METHOD OF SPECULATIVE PACKET TRANSMISSION

FIELD OF THE INVENTION

Some embodiments of the invention are related to the field of communication using flow control-based link management.

BACKGROUND OF THE INVENTION

A computer system may include a Peripheral Component Interconnect (PCI) Express (PCIe) host bridge able to connect between a processor and a memory unit, a graphics card, or other units. PCIe is an Input/Output (I/O) protocol allowing transfer of packetized data over high-speed serial interconnects with flow control-based link management.

PCIe includes a Flow Control (FC) mechanism which utilizes header FC credits and data FC credits. For example, a first PCIe endpoint or device ("sending device") intends to send 37 PCIe packets to a second PCIe endpoint or device ("receiving device"). The receiving device advertises its receive buffer capability, by allocating a number of FC credits (for example, 20 FC credits) for incoming PCIe packets expected to be received from the sending device, and communicating the FC credit allocation to the sending device.

The sending device utilizes a parameter to track the number of FC credits allocated by the receiving device and remaining available to the sending device. Based on the advertised FC credit allocation information, the sending device sends 20 PCIe packets to the receiving device. Since the transmission consumes 20 FC credits, the sending device decreases 20 FC credits from the value of the parameter that tracks the number of FC credits available to the sending device.

The receiving device periodically advertises updates to the number of available receive buffer FC credits, for example, when receive buffer space becomes available. This is performed by issuing an FC Update (FCU) from the receiving device to the sending device. For example, upon reception and processing of PCIe packets corresponding to 15 out of the 20 FC credits, the receiving device advertises that additional 15 FC credits are available for subsequent send operations of the sending device.

The sending device has a PCIe packet pending for transmission, which consumes 17 FC credits. However, the receiving device advertises a total of 15 FC credits available for new PCIe packets incoming from the sending device. In accordance with the PCIe protocol, the sending device is not allowed to initiate PCIe packet transmission to the receiving device until all the FC credits, which are required in order to accept and store the PCIe packet(s) by the receiving device, are obtained by the sending device. In this situation, the sending device suspends packet transmission until two additional FC credits are obtained. This may result in delays in initiating PCIe transmissions, as well as reduced throughput and non-optimal utilization of the PCIe link.

In some systems, transmission delays may depend on the size of the receive buffer of the receiving device, and/or on the frequency of the FCU cycle. A relatively small receive buffer may become available rapidly; but may also result in frequent pauses in data flow, due to a substantially constant lack of FC credits, thereby degrading the effective bandwidth.

Furthermore, significant FC processing and/or update latency may require additional receive buffer space, in order to compensate for FCU delays. In a fast PCIe link, FCU delays may be equivalent to delays in transmission of large amounts of data. Therefore, a significant portion of the receive buffer may be required to compensate for FCU latency, and the effective utilization of the receive buffer may be low.

SUMMARY OF THE INVENTION

Some embodiments of the invention include, for example, devices, systems and methods of speculative packet transmission.

Some embodiments include, for example, an apparatus for speculative packet transmission, the apparatus including a credit-based flow control interconnect device to initiate speculative transmission of a Transaction Layer Packet if a number of available flow control credits is insufficient for completing the transmission.

In some embodiments, a method for speculative packet transmission includes initiating speculative transmission of a Transaction Layer Packet from a credit-based flow control interconnect device if a number of available flow control credits is insufficient for completing the transmission.

In some embodiments, a system for speculative packet transmission includes a credit-based flow control interconnect device to initiate speculative transmission of a Transaction Layer Packet if a number of available flow control credits is insufficient for completing the transmission; and a credit-based flow control interconnect link layer to transfer the Transaction Layer Packet.

In some embodiments, a system for speculative transmission of PCI Express packets includes a first PCI Express device to advertise a number of available flow control credits; a second PCI Express device to initiate speculative transmission of a PCI Express Transaction Layer Packet if the number of available flow control credits is insufficient for completing the transmission; a PCI Express link layer to transfer the PCI Express Transaction Layer Packet from the second PCI Express device to the first PCI Express device; a receive buffer comprised in the first PCI Express device, the receive buffer to advertise an updated number of available flow control credits during the speculative transmission; and a flow control manager comprised in the second PCI Express device, the flow control manager to check, substantially immediately prior to utilization of all flow control credits that were initially available at commencement of the speculative transmission, whether or not the updated number of available flow control credits is sufficient for completing the transmission, wherein the flow control manager is to nullify the PCI Express Transaction Layer Packet if the updated number of available flow control credits is insufficient for completing the transmission.

Some embodiments may include, for example, a computer program product including a computer-usable medium including a computer-readable program, wherein the computer-readable program when executed on a computer causes the computer to perform methods in accordance with some embodiments of the invention.

Some embodiments of the invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
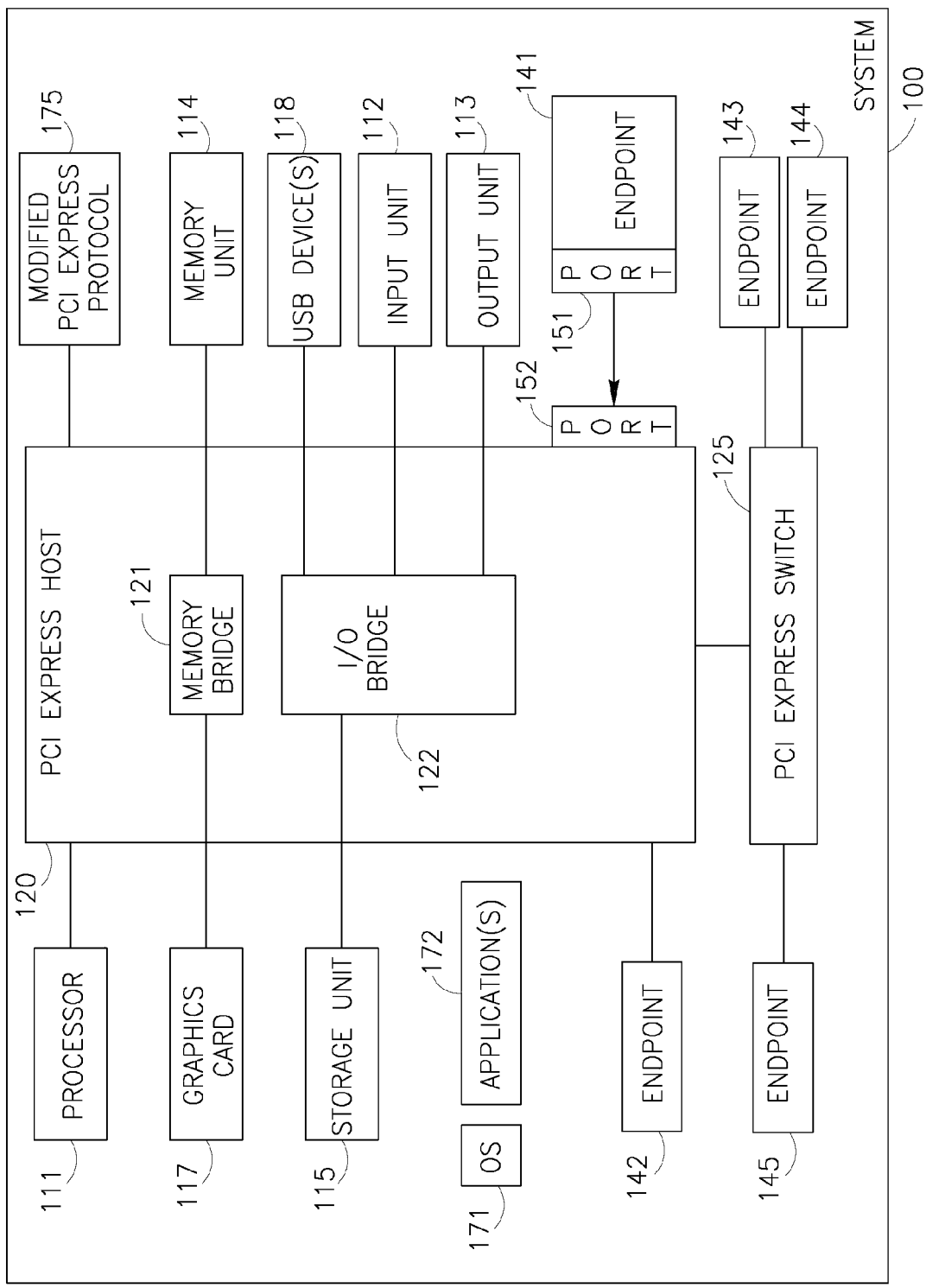
FIG. 1 is a schematic block diagram illustration of a system able to utilize speculative packet transmission in accordance with a demonstrative embodiment of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

The terms "sending device" or "sending endpoint" or "sending port" as used herein include, for example, a PCIe device, a PCIe endpoint, a PCIe port, or other PCIe unit or PCIe-compatible unit able to send or transfer-out PCIe data; or a device, endpoint, port, or unit able to send or transfer-out data using a Flow Control (FC) mechanism, a FC credits mechanism, or other FC management mechanism.

The terms "receiving device" or "receiving endpoint" or "receiving port" as used herein may include, for example, a PCIe device, a PCIe endpoint, a PCIe port, or other PCIe unit or PCIe-compatible unit able to receive or transfer-in PCIe data; or a device, endpoint, port, or unit able to receive or transfer-in data using a Flow Control (FC) mechanism, a FC credits mechanism, or other FC management mechanism.

The terms "packet" or "Transaction Layer Packet" or "TLP" as used herein include, for example, a PCIe packet, a data item, a frame, a message, a message or data item communicated through a reliable communication channel or link, a sequence of set of bits, a sequence or set of bytes, a formatted block of data, a combination of Protocol Control Information and user data, a combination of Protocol Control Information and data payload, or the like.

Although portions of the discussion herein relate, for demonstrative purposes, to PCIe communications or devices or links, embodiments of the invention may be used with other types of communications or devices or links; for example, communications, devices or links utilizing transfer of packetized data over high-speed serial interconnects; communications, devices or links utilizing FC-based link management; communications, devices or links utilizing credit-based FC; communications, devices or links utilizing a fully-serial interface; communications, devices or links utilizing a split-transaction protocol implemented with attributed packets; communications, devices or links that prioritize packets for improved or optimal packet transfer; communications, devices or links utilizing scalable links having one or more lanes (e.g., point-to-point connections); communications, devices or links utilizing a high-speed serial interconnect; communications, devices or links utilizing differentiation of different traffic types; communications, devices or links utilizing a highly reliable data transfer mechanism (e.g., using sequence numbers and/or End-to-end Cyclic Redundancy Check (ECRC)); communications, devices or links utilizing a link layer to achieve integrity of transferred data; communications, devices or links utilizing a physical layer of two low-voltage differentially driven pairs of signals (e.g., a transmit pair and a receive pair); communications, devices or links utilizing link initialization including negotiation of lane widths and frequency of operation; communications, devices or links in accordance with a communication protocol which allows to transmit a data packet only when it is known to the sending side that a receiving buffer is available to receive the packet at the receiving side; communications, devices or links utilizing request packets and/or response packets; communications, devices or links utilizing Message Space and/or Message Signaled Interrupt (MSI) and/or in-band messages; communications, devices or links utilizing a software layer configuration space; communications, devices or links utilizing a Maximum Payload Size (MPS) parameter; InfiniBand communications, devices or links; PCIe communications, devices or links; future equivalents or evolutions of PCIe; communication protocols or standards similar to PCIe; or the like.

At an overview, some embodiments of the invention provide devices, systems and method of speculative packet transmission, optionally implemented using a modified PCIe protocol or other suitable FC management protocol. In some embodiments, a sending device is allowed to transmit packets, and actually transmits the packets, prior to accumulation of all the required FC credits at the receive buffer of the receiving device.

If additional FC credits, which are required in order to complete the packet transmission, become available to the sending device before the packet transmission is completed, then the packet is fully transmitted by the sending device. In such case, the packet is successfully received by the receiving device, since the FC credits that were "missing" when the transmission was initiated, became available at the receiving side during the transmission.

In contrast, if the additional FC credits, which are required in order to complete the packet transmission, do not become available to the sending device immediately prior to completion of the packet transmission, then the sending device truncates or nullifies the packet (namely, indicates that the packet is erroneous and is to be discarded by the receiving device). In such case, the packet is discarded by the receiving device; and the sending device subsequently re-transmits the packet, for example, once a sufficient number of FC credits are available to accommodate the packet transmission.

In some embodiments, speculative packet transmission may improve the utilization of the receive buffer; may reduce the amount and/or the length of idle periods (which result from insufficient FC credits accumulated by the sending device); may improve overall protocol efficiency and resource utilization; may reduce buffering and buffering-related overhead; may reduce or avoid data flow interruptions; may improve the utilization of systems having under-sized receive buffers; may allow reduction in the size of receive buffers; and/or may increase the effective throughput or bandwidth over the FC managed link.

FIG. 1 schematically illustrates a block diagram of a system 100 able to utilize speculative packet transmission in accordance with some demonstrative embodiments of the invention. System 100 may be or may include, for example, a computing device, a computer, a Personal Computer (PC), a server computer, a client/server system, a mobile computer, a portable computer, a laptop computer, a notebook computer, a tablet computer, a network of multiple inter-connected devices, or the like.

System 100 includes, for example, a processor 111, an input unit 112, an output unit 113, a memory unit 114, a storage unit 115, and a graphics card 117. System 100 may optionally include other suitable hardware components and/or software components.

Processor 111 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 executes instructions, for example, of an Operating System (OS) 118 of system 100 or of one or more applications 119.

Input unit 112 includes, for example, a keyboard, a keypad, a mouse, a touch-pad, a track-ball, a stylus, a microphone, or other suitable pointing device or input device. Output unit 113 includes, for example, a monitor, a screen, a Cathode Ray Tube (CRT) display unit, a Liquid Crystal Display (LCD) display unit, a plasma display unit, one or more audio speakers or earphones, or other suitable output devices. Graphics card 117 includes, for example, a graphics or video processor, adapter, controller or accelerator.

Memory unit 114 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 115 includes, for example, a hard disk drive, a floppy disk drive, a Compact Disk (CD) drive, a CD-ROM drive, a Digital Versatile Disk (DVD) drive, or other suitable removable or non-removable storage units. Memory unit 114 and/or storage unit 115, for example, store data processed by system 100.

In some embodiments, components of system 100 may be enclosed in a common housing or packaging, and may be interconnected or operably associated using one or more wired or wireless links. In other embodiments, components of system 100 may be distributed among multiple or separate devices or locations, may be implemented using a client/server configuration or system, or may communicate using remote access methods.

System 100 may further include a PCIe host bridge 120 able to connect among multiple components of system 100, e.g., among multiple PCIe endpoints or PCIe devices. The PCIe host bridge 120 may include a memory bridge 121 or other memory controller, to which the memory unit 114 and/or the graphics card 117 may be connected. The PCIe host bridge 120 may further include an Input/Output (I/O) bridge 122, to which the input unit 112, the output unit 113, the storage unit 115, the communication unit 116, and one or more Universal Serial Bus (USB) devices 118 may be connected.

System 100 optionally includes a PCIe switch 125 able to interconnect among multiple PCIe endpoints or PCIe devices. In some embodiments, the PCIe switch 125 is implemented as a separate or stand-alone unit or component; in other embodiments, the PCIe switch 125 is integrated in, embedded with, or otherwise implemented using the PCIe host bridge 120 or other suitable component.

The topology or architecture of FIG. 1 are shown for demonstrative purposes, and embodiments of the invention may be used in conjunction with other suitable topologies or architectures. For example, in some embodiments, memory bridge 121 is implemented as a memory controller and is included or embedded in the PCIe host bridge 120. In some embodiments, a "north bridge" or a "south bridge" are used, and optionally include the PCIe host bridge 120 and/or a similar PCIe host component. In some embodiments, memory bridge 121 and PCIe host bridge 120 (and optionally the processor 111) are implemented using a single or common Integrated Circuit (IC), or using multiple ICs. Other suitable topologies or architectures may be used.

The PCIe host bridge 120 and/or the PCIe switch 125 may interconnect among multiple PCIe endpoints or PCIe devices, for example, endpoints 141-145. For demonstrative purposes, endpoint 141 may send data to the memory bridge 121; accordingly, endpoint 141 (or a port 151 thereof) is referred to herein as "sending endpoint" or "sending device", whereas the memory bridge 121 (or a port 152 of the PCIe host 120) is referred to herein as "receiving endpoint" or "receiving device". Other components may operate as a sending device and/or as a receiving device. For example, processor 111 may be a sending device and memory unit 114 may be a receiving device; port 151 may be a sending device and port 152 may be a receiving device, or vice versa; USB device 118 may be a sending device and storage unit 115 may be a receiving device; the memory bridge 121 may operate as a receiving device (e.g., vis-à-vis a first endpoint or device) and/or may operate as a sending device (e.g., vis-à-vis a second endpoint or device); or the like. In some embodiments, the receiving device may send back data or control data to the sending device, or vice versa; for example, the communication between the sending device and the receiving device may be unilateral or bilateral.

Optionally, the sending device may operate utilizing a device driver, and the receiving device may operate utilizing a device driver. In some embodiments, the device drivers, as well as PCIe host bridge 120 and PCIe switch 125, may support a modified PCIe protocol 175 in accordance with some embodiments of the invention.

In some embodiments, the sending device transfers data to the receiving device over a PCIe link using the modified PCIe protocol 175. The modified PCIe protocol 175 includes a modified a Flow Control (FC) mechanism which utilizes header FC credits and data FC credits and allows speculative packet transmission.

Figure 2:
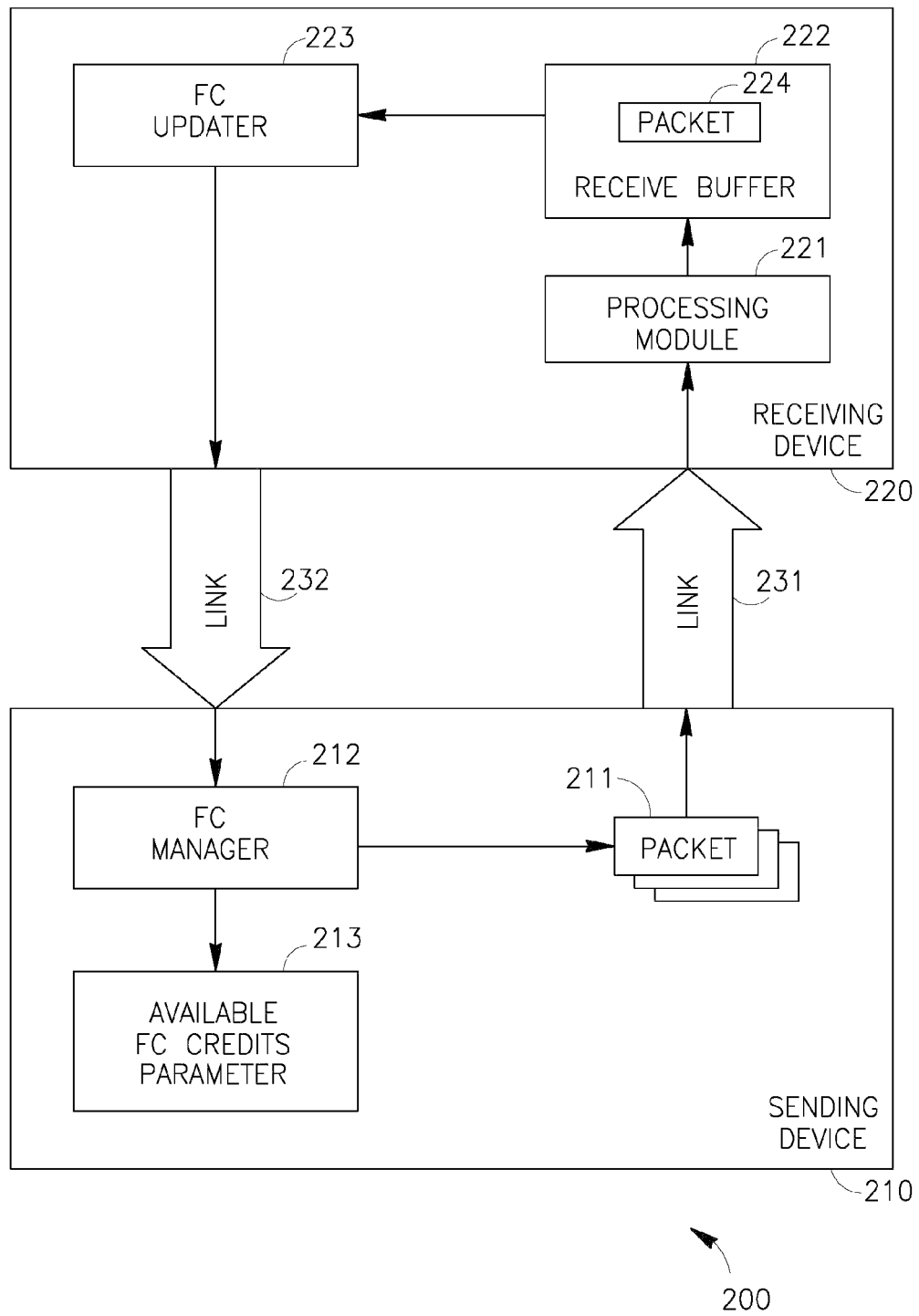
FIG. 2 is a schematic block diagram illustration of a system able to utilize speculative packet transmission in accordance with another demonstrative embodiment of the invention.

FIG. 2 schematically illustrates a block diagram of a system 200 able to utilize speculative packet transmission in accordance with some demonstrative embodiments of the invention. System 200 may be a demonstrative example of a portion of system 100.

System 200 includes, for example, a sending device 210 and a receiving device 220. For example, sending device 210 may be a first PCIe device, unit or port (e.g., PCIe endpoint 141 of FIG. 1, or PCIe port 151 of FIG. 1). Similarly, receiving device 220 may be a second PCIe device, unit or port (e.g., the memory bridge 121 of FIG. 1, or PCIe port 152 of FIG. 1).

The sending device 210 and the receiving device 220 are connected through a link, for example, a PCIe link or other FC-based link. For demonstrative purposes, the PCIe link is shown in FIG. 2 as a link 231 for communication from sending device 210 to receiving device 220, and as a link 232 for communication from receiving device 220 to sending device 210.

The sending device 210 intends to send a PCIe packet 211 to the receiving device 220. The receiving device 220 utilizes a receive buffer 222, and advertises the available capacity of the receive buffer 222, in terms of available FC credits. For example, the receiving device 220 allocates a number of FC credits (e.g., 20 FC credits) for incoming PCIe packets expected to be received from the sending device 210; and the receiving device 220 communicates to the sending device 210 the allocation of the available FC credits.

The sending device 210 utilizes a FC manager 212 to track the number of FC credits allocated by the receiving device 220 and remaining available to the sending device 210, for example, using an available FC credits parameter 213. Accordingly, the available FC credits parameter 213 indicates that 20 FC credits are available for transmission of packet(s) 211 from sending device 210 to receiving device 220.

In accordance with some embodiments of the invention, the sending device 210 initiates a speculative transmission of packets 211 to the receiving device 220, even though the packet 211 intended for transmission requires a number of FC credits greater than the number of available FC credits (as indicated by the available FC credits parameter 213). For example, the sending device 210 is allowed to transmit packets 211, and actually transmits the packets 211, prior to accumulation of all the required FC credits at the receive buffer 222 of the receiving device 220, and prior to an indication by the FC manager 212 that the available FC credits are sufficient for packet 211 transmission.

For example, the sending device 210 initiates transmission of packet 211 that correspond to a number of FC credits (e.g., 22 FC credits) greater than the number of available FC credits indicated as available by the available FC credits parameter 213 (e.g., 20credits). This is performed, for example, instead of delaying the transmission until the number of available FC credits increases to be sufficient for transmitting the packet 211.

During the transmission of the packet 211 from sending device 210 to receiving device 220, additional space may become available in the receive buffer 222; for example, due to processing of incoming packet(s) 224 by processing module 221, and/or due to transfer-out of incoming packets 224 from the receive buffer 222 to other sub-units of the receiving device 220. The receiving device 220 periodically advertises updates to the number of available receive buffer 222 FC credits. For example, a FC updater 223 transmits a FC Update (FCU) to the FC manager 212 of sending device 210. Upon receiving the FCU, the FC manager 212 updates (e.g., increases) the value of the available FC credits parameter 213.

If the additional FC credits (e.g., two FC credits) required to complete the transmission of packets 211 become available to the sending device 210 before the transmission is completed, then the packets 211 are fully transmitted by the sending device 210. In such case, the packets 211 are successfully received by the receiving device 220, since the FC credits that were "missing" when the transmission was initiated, became available at the receive buffer 222 during the transmission.

In contrast, if the additional FC credits (e.g., two FC credits), which are required in order to complete the packet 211 transmission, do not become available to the sending device 210 immediately prior to completion of the transmission, then the sending device 210 truncates or nullifies the packet 211, namely, indicates that packet 211 is erroneous and is to be discarded by the receiving device; or, the sending device 210 otherwise aborts the speculative transmission without actual utilization of the FC credits and/or in a manner substantially transparent to the receiving device 220. In such case, packet 211 is discarded by the receiving device 220; and the sending device 210 subsequently re-transmits the packet 211, for example, once a sufficient number of FC credits are available to accommodate the packet 211 transmission (e.g., upon receiving one or more FCUs).

In some embodiments, the sending device 210 is allowed to submit (and actually submits) packet(s) 211 for transmission when there are only partial FC credits available. If an FCU is received by the sending device 210 during packet transmission, and provides additional FC credits sufficient to properly complete the transmission, the sending device 210 continues with and completes the sending operation. In contrast, if an FCU is not received by the sending device 210 until a point in which the sending device 210 runs out of already available FC credits, then packet transmission is interrupted and terminated on the link 231 by packet nullification. In such case, the receiving device 220 detects packet nullification on the link 231, and discards the partial packet without reporting any error. This may be performed, for example, utilizing the Transaction Layer Packet (TLP) nullification mechanism of PCIe, or other suitable packet nullification mechanisms.

In some embodiments, the sending device 210 may initiate speculative packet transmission, only if a particular minimal amount of FC credits (e.g., for respective packet types) is available. For example, in some embodiments, the sending device 210 may initiate speculative packet transmission if at least 90 percent of the required FC credits are available. Other suitable conditions or thresholds may be used. In some embodiments, optionally, the sending device 210 may prioritize speculative transmissions behind regular (e.g., non-speculative) transmissions, such that packet types associated with available FC credits are transmitted prior to packets that require speculative transmission for sending out. For example, the sending device 210 may associate speculative packet transmissions with a first priority level; may associate non-speculative packet transmissions with a second, different, priority level (e.g., a higher level of priority); and may schedule transmissions of one or more packets in accordance with their respective priority levels.

In some embodiments, the modified PCIe protocol 175 may be implemented in both the sending device 210 and the receiving device, or only in the sending device 210 and not in the receiving device 220. In some embodiments, the capability of the sending device 210 to perform speculative packet transmission may be unknown to the receiving device 220, may be "hidden" from the receiving device 220, or may otherwise be un-exposed to the receiving device 220, since this capability may not require a modification in the receiving device 220, the receive buffer 222 or their functionality. For example, by utilizing packet nullification (e.g., due to insufficient FC credits), data integrity is not compromised and overrun conditions of the receive buffer 222 are avoided. In some embodiments, the modified PCIe protocol 175 may be implemented using relaxation of rules regarding credit accumulation for TLP transmission.

In some embodiments, speculative packet transmission allows the system 200 to utilize otherwise-idle link periods for packet transmissions. If the speculation is successful (e.g., an FCU is issued during the speculative transmission and provides sufficient FC credits in time), the early speculative transmission reduces delays or link pauses, without exposing the receive buffer 222 to overrun conditions. In contrast, if the speculation fails (e.g., if an FCU is not issued during the speculative transmission, or if the FCU is issued but does not provide sufficient FC credits in time), the sending device 210 operates to nullify the speculative packet transmission, thereby defaulting to the state that would have been reached without speculative transmission (namely, no progress in packet transmission).

In some embodiments, link utilization and performance measurements may indicate that for fast PCIe links, a significant portion of FC credits are released (namely, become available) by the receiving device 220 while the sending device 210 is in the process of transmitting subsequent packets; therefore, the speculative packet transmission may compensate or "cover" for FC credit release delays, and/or for FCU delays. In systems characterized by substantially constant data flow and substantially constant FCUs circulating in the system, the chances of successful speculative transmissions are improved.

In some embodiments, speculative packet transmission may reduce idle periods in a system having a limited capacity of receive buffering (and associated FC credits). In other embodiments, speculative packet transmission may relax or mitigate the minimal receive buffering requirement that still allows maximal data bandwidth, due to effective reduction in FC credit reuse cycle.

In some embodiments, for example, a PCIe Generation-2 link may connect the sending device 210 and the receiving device 220, and may be able to transfer data at a rate of approximately 5 Gigabit per second. The sending device 210 and the receiving device 220 may send PCIe packets over the link substantially continuously, using a data payload of one kilobyte. The transmission time of a packet across the link is approximately 132 nanoseconds. A combined transmit/receive delay ("packet transmit/receive delay") over the link is approximately 200 nanoseconds. The receiving device 220 may implement cut-through buffering, such that a delay of approximately 20 nanoseconds is attributed to packet processing in the receiving device 220, to FC release delays, and/or to FC credit reuse delays. Once the FCU is issued by the receiving device 220, approximately 200 nanoseconds are required for the FCU to be received at the sending device ("FCU transmit/receive delay"). Cumulatively, a total of approximately 552 nanoseconds (the total of 132, 200, 20 and 200 nanoseconds) thus corresponds to a time period that commences upon the initiation of the PCIe transmission by the sending devices, and ends upon receiving the FCU; this may be referred to as "FCU roundtrip".

An FCU roundtrip of approximately 552 nanoseconds may require the receiving device 220 to use a receive buffer 222 able to accommodate at least five packets (since 552 divided by 132 is 4.18, and 4.18 is rounded up to 5). Furthermore, the receive buffer 222 may be implemented to utilize a power-of-two buffering space, such that receive buffer 222 may be required to accommodate eight packets. In contrast, if the sending device 210 utilizes speculative packet transmission, the FCU roundtrip may be reduced (e.g., by approximately 132 nanoseconds), from approximately 552 nanoseconds to approximately 420 nanoseconds. A FCU roundtrip of approximately 420 nanoseconds may require the receiving device to use a receive buffer 222 able to accommodate only four packets (since 420 divided by 132 is 3.18, and 3.18 is rounded up to 4). The reduced FCU roundtrip thus allows the system to sustain maximum link bandwidth while requiring a reduced-size receive buffer 222, having a buffering space to accommodate four packets instead of eight packets.

In some embodiments, speculative packet transmission does not require and/or does not include speculative processing of packets that are received by the receiving device 220.

In some embodiments, speculative packet transmission does not take into account a "permission" from the receiving device 220 for sending packets to the receiving device 220, and does not take into account an inquiry (or lack of inquiry) of the receiving device 220 for such permission to send packets (e.g., in contrasts with some Remote Direct Memory Access (RDMA) mechanisms).

In some embodiments, if a speculative transmission fails, the receiving device 220 may not know that a speculative transmission was attempted by the sending device 210; and/or, the receiving device 220 may not know that the speculative transmission has failed. Furthermore, re-transmission of the packet (after a speculative transmission that failed) may be performed by the sending device substantially automatically; without requesting from the receiving device 220 permission to re-transmit the packet; without receiving from the receiving device 220 permission to re-transmit the packet; without notifying the receiving device 220 that the re-transmission is a re-transmission of a failed speculative transmission; and/or without otherwise indicating, in the re-transmitted packet or in connection therewith, that the packet is re-transmitted.

In some embodiments, speculative packet transmission does not require and/or does not include end-to-end transaction layer FC (for example, similar to some RDMA mechanisms); but rather, utilizes a transmitter-managed link-level FC managed by the sending device 210.

In some embodiments, speculative packet transmission does not require and/or does not include speculative packet routing, and does not include or require forwarding of a packet to multiple destinations (e.g., target buffers) before the actual destination is determined (e.g., as performed in some switching fabric routing mechanisms).

Figure 3:
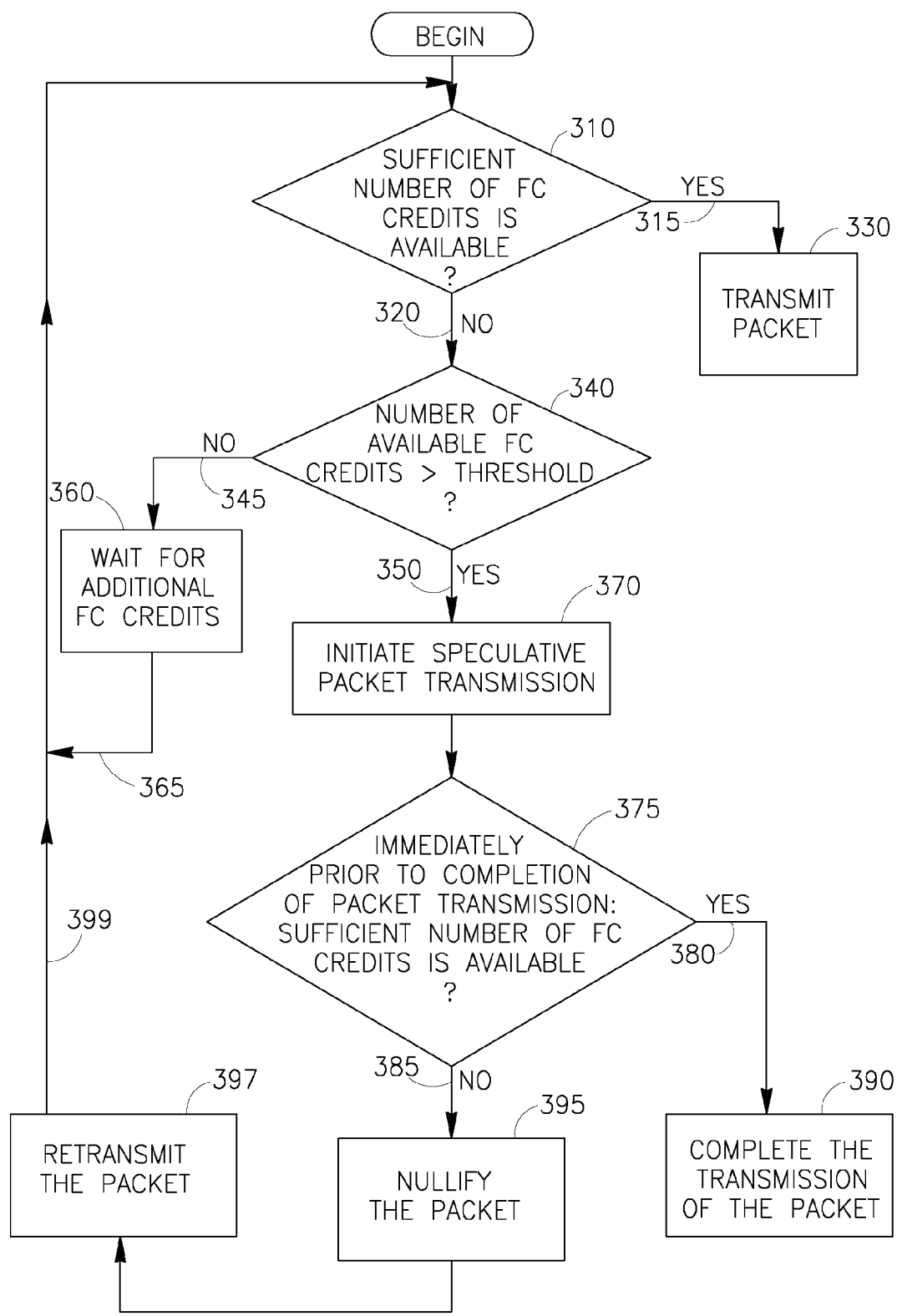
FIG. 3 is a schematic flow-chart of a method of speculative packet transmission in accordance with a demonstrative embodiment of the invention.

FIG. 3 is a schematic flow-chart of a method of speculative packet transmission in accordance with some demonstrative embodiments of the invention. Operations of the method may be used, for example, by system 100 of FIG. 1, by system 200 of FIG. 2, and/or by other suitable units, devices and/or systems.

In some embodiments, the method may include, for example, checking by a sending device whether or not a sufficient number of FC credits is available in order to transmit a packet (block 310). This may be performed, for example, by checking the value of a local parameter of the sending device, indicating the number of available FC credits.

If the number of available FC credits is sufficient (arrow 315), then the method may include transmitting the packet (block 330), e.g., using non-speculative transmission.

In contrast, if the number of available FC credits is insufficient (arrow 320), then the method may proceed with the operations of block 340 and onward.

As indicated in block 340, the method may include, for example, checking whether the number of available FC credits is greater than a threshold value. The threshold value may be, for example, a percentage of the required FC credits, a pre-defined number, a threshold value selected to correspond to a particular type of packet, or the like.

If the number of available FC credits is not greater than the threshold value (arrow 345), then the method may include, for example, waiting for additional FC credits to become available (block 360). This may include, for example, avoiding the initiation of speculative packet transmission, and proceeding with the operations of block 310 and onward (arrow 365).

In contrast, if the number of available FC credits is greater than the threshold value (arrow 350), then the method may proceed with the operations of block 370 and onward.

As indicated at block 370, the method may include, for example, initiating speculative packet transmission. This may include, for example, transmitting the packet although there are insufficient FC credits upon initiation of packet transmission.

As indicated at block 375, the method may include, for example, checking whether a sufficient number of FC credits is available, substantially immediately prior to completing the transmission of the packet, or substantially immediately prior to utilization (or exhaustion, or expiration, or "running out") of all the initially-available FC credits, or substantially immediately prior to utilization of all the FC credits that were available upon commencement of the transmission. This may be performed, for example, by checking the value of the local parameter of the sending device that indicates the number of available FC credits; since this parameter may be modified (e.g., increased) by an FCU which may be received during the packet transmission period. In some embodiments, the sending device may check whether the updated number of FC credits is sufficient to complete the transmission; in other embodiments, additionally or alternatively, the sending device may check whether or not an FCU was received during the packet transmission period, and/or may check or otherwise utilize the FCU information to determine whether a sufficient number of FC credits is available for the sending device to complete the transmission.

If, substantially immediately prior to completing the transmission of the packet, or substantially immediately prior to utilization of all the initially-available FC credits, or substantially immediately prior to utilization of all the FC credits that were available upon commencement of the transmission, a sufficient number of FC credits is available (arrow 380), then the method may include, for example, completing the transmission of the packet (block 390). This may include, for example, marking the packet with an indication that the packet is complete or non-erroneous. This may be followed, for example, by accepting the complete packet at the receiving device.

In contrast, if, substantially immediately prior to completing the transmission of the packet, or substantially immediately prior to utilization of all the initially-available FC credits, or substantially immediately prior to utilization of all the FC credits that were available upon commencement of the transmission, a sufficient number of FC credits is not available (arrow 385), then the method may include, for example, nullifying the packet (block 395). This may include, for example, marking the packet with an indication that the packet is nullified, truncated, incomplete, erroneous, or should be discarded by the receiving device. This may be followed, for example, by discarding the nullified packet at the receiving device; and by re-transmitting the packet by the sending device (block 397), for example, using non-speculative transmission or using speculative transmission, e.g., by proceeding with the operations of block 310 and onward (arrow 399).

Other suitable operations or sets of operations may be used in accordance with embodiments of the invention.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus for speculative packet transmission, the apparatus comprising:

a credit-based flow control interconnect device initiates speculative transmission of a Transaction Layer Packet (TLP) from a first PCIe device to a second PCIe device if a number of available flow control (FC) credits on said first PCIe device is less than a number of flow control credits required by a remote receive buffer to accept the TLP and greater than a threshold value of a minimum number of FC credits, otherwise waiting for additional number of flow control credits, wherein the credit-based flow control interconnect device checks, substantially immediate prior to utilization of all flow control credits that were initially available at commencement of the speculative transmission, whether or not an updated number of available flow control credits is sufficient for completing the transmission;

an interconnect link layer transmits said TLP to said second PCIe device if said additional number of FC credits required to complete transmission of said TLP become available to said first PCIe device before said speculative transmission is completed, otherwise said first PCIe device aborts said speculative transmission and nullifies any packet data already sent;

wherein said second PCIe device advertises the available capacity of its receive buffer in terms of FC credits to said first PCIe device; and wherein said threshold is a percentage of a number of FC credits required for transmission of said TLP, a predefined number, or a number corresponding to a particular type of packet.

2. The apparatus of claim 1, wherein if the updated number of available flow control credits is less than the required number of FC credits, the credit-based flow control interconnect device is to nullify the Transaction Layer Packet.

3. The apparatus of claim 2, wherein if the updated number of available flow control credits is less than the required number of FC credits, the credit-based flow control interconnect device is to re-transmit the Transaction Layer Packet.

4. The apparatus of claim 1, further comprising:
a flow control manager to receive a flow control update from a remote receive buffer, and to modify, based on the flow control update, a value of a parameter indicating the number of available flow control credits.

5. The apparatus of claim 1, wherein the credit-based flow control interconnect device is to associate speculative packet transmissions with a first priority level, to associate non-speculative packet transmissions with a second, higher, priority level, and to schedule transmissions of one or more Transaction Layer Packets in accordance with their respective priority levels.

6. The apparatus of claim 1, wherein the credit-based flow control interconnect device comprises a PCI Express device.

7. A method for speculative packet transmission, the method comprising:
initiating speculative transmission of a Transaction Layer Packet (TLP) from a first PCIe device to a second PCIe device if a number of available flow control (FC) credits on said first PCIe device is less than a number of flow control credits required by a remote receive buffer to accept the TLP and greater than a threshold value of a minimum number of FC credits, otherwise waiting for additional number of flow control credits, wherein the first PCIe flow device checks, substantially immediate prior to utilization of all flow control credits that were initially available at commencement of the speculative transmission, whether or not an updated number of available flow control credits is sufficient for completing the transmission;
transmitting said TLP to said second PCIe device if said additional FC credits required to complete transmission of said TLP become available to said first PCIe device before speculative transmission is complete, otherwise said first PCIe device aborting said speculative transmission and nullifying any packet data already sent;

advertising to said first PCIe device the available capacity of a receive buffer on said second PCIe device in terms of FC credits; and wherein said threshold is a percentage of a number of FC credits required for transmission of said TLP, a predefined number, or a number corresponding to a particular type of packet.

8. The method of claim 7, further comprising:
nullifying the Transaction Layer Packet if the updated number of available flow control credits is less than the required number of FC credits.

9. The method of claim 8, further comprising:
re-transmitting the Transaction Layer Packet if the updated number of available flow control credits is less than the required number of FC credits.

10. The method of claim 7, comprising:
initiating transmission of the Transaction Layer Packet if the number of available flow control credits is less than a number of flow control credits required by a remote receive buffer to accept the Transaction Layer Packet and is also less than said minimum number of FC credits.

11. A system for speculative packet transmission, the system comprising:
a credit-based flow control interconnect device to initiate speculative transmission of a Transaction Layer Packet (TLP) from a first PCIe device to a second PCIe device if a number of available flow control (FC) credits on said first PCIe device is both less than a number of flow control credits required by a remote receive buffer to accept the TLP and greater than a threshold value of a minimum number of FC credits, otherwise waiting for additional number of flow control credits, wherein the credit-based flow control interconnect device checks, substantially immediate prior to utilization of all flow control credits that were initially available at commencement of the speculative transmission, whether or not an updated number of available flow control credits is sufficient for completing the transmission;

a credit-based flow control interconnect link layer to transfer the Transaction Layer Packet to said second PCIe device only if sufficient said additional number of FC credits required to complete transmission of said TLP become available to said first PCIe device before completion of said speculative transmission, otherwise said credit-based flow control interconnect device aborts said speculative transmission and nullifies any packet data already sent; and wherein said threshold is a percentage of a number of FC credits required for transmission of said TLP, a predefined number, or a number corresponding to a particular type of packet.

12. The system of claim 11, further comprising:
an additional credit-based flow control interconnect device to advertise an updated number of available flow control credits,
wherein the credit-based flow control interconnect device is to check, substantially immediately prior to utilization of all flow control credits that were initially available at commencement of the speculative transmission, whether or not the updated number of available flow control credits is sufficient for completing the transmission.

13. A system for speculative transmission of PCI Express (PCIe) packet, the system comprising:

a first PCIe device to advertise the available capacity of its receive buffer as a number of available flow control credits to a second PCIe device;

said second PCIe device to initiate speculative transmission of a PCIe Transaction Layer Packet (TLP) to said first PCIe device if the number of available flow control credits on said first PCIe device is less that required for non-speculative transmission but greater than a threshold number of FC credits, wherein said threshold number of FC credits is greater than zero and less than the number of FC credits required for non-speculative transmission of said TLP, otherwise waiting for additional number of flow control credits;

a PCIe link layer to transfer the PCIe TLP from the second PCIe device to the first PCIe device only if sufficient additional FC credits required to complete transmission of said TLP become available to said second PCIe device before speculative transmission is complete;

said receive buffer comprised in the first PCI Express device, the receive buffer to advertise an updated number of available flow control credits during speculative transmission; and a flow control manager comprised in the second PCIe device, the flow control manager to check, substantially immediately prior to utilization of all flow control credits that were initially available at commencement of the speculative transmission, whether or not the updated number of available flow control credits is sufficient for completing the transmission, wherein the flow control manager is to nullify the PCIe TLP if the updated number of available flow control credits is less than the number of FC credits required for non-speculative transmission.

* * * * *